United States Patent [19]

Ruppert et al.

[11] 4,419,901
[45] Dec. 13, 1983

[54] DEVICE FOR MEASURING THE AXIAL FORCE IN A SHAFT JOURNALLED BY ROLLER BEARINGS

[75] Inventors: Helmut Ruppert, Kassel; Dietmar Frase, Dittelbrunn, both of Fed. Rep. of Germany

[73] Assignees: Thyssen Industrie AG, Essen; SKF Kugellagerfabriken GmbH, Schweinfurt, both of Fed. Rep. of Germany

[21] Appl. No.: 361,526

[22] Filed: Mar. 23, 1982

[30] Foreign Application Priority Data

Mar. 24, 1981 [DE] Fed. Rep. of Germany ....... 3111434

[51] Int. Cl.³ .............................................. G01L 5/12
[52] U.S. Cl. ................................................. 73/862.49
[58] Field of Search ..................................... 73/862.49

[56] References Cited

U.S. PATENT DOCUMENTS

| | | | |
|---|---|---|---|
| 3,033,031 | 5/1962 | Gruber | 73/862.49 |
| 3,745,819 | 7/1973 | Earl | 73/862.49 |
| 4,129,036 | 12/1978 | Bliemeister | 73/862.49 |
| 4,142,408 | 3/1979 | Riazuelo | 73/862.49 |
| 4,287,758 | 9/1981 | Swearingen | 73/862.49 |

*Primary Examiner*—Howard A. Birmiel
*Attorney, Agent, or Firm*—Becker & Becker, Inc.

[57] ABSTRACT

A device for measuring axial force in a shaft journalled or mounted with two roller bearings arranged side by side in a housing, such measuring occurring by means of wire strain gauges or the like. The inner ring of the roller bearing on the shaft side engages a shaft shoulder, and the end faces of the roller bodies of the roller body row facing the bearing cover are supported by the flangeless inner ring of the adjoining roller bearing against a flanged ring or angle ring which is disengageably arranged on the shaft. This device is especially intended for wheel-set shafts of rail vehicles during travelling operation. Those end faces of the roller bodies of the two roller body rows facing each other are supported on a central flanged ring which transfers force and is movable in the direction of force when force is applied. A gauge ring is located between the central flanged ring and those two end faces of the roller bearing rings located diametrically opposite each other, with a part of the gauge ring being arranged transverse to the shaft axis, being operatively connected with the central flanged ring, and being provided with wire strain gauges or the like. The gauge ring has a part remote from the central flanged ring. This part is positively connected, by means of pressure surfaces on both sides, with the diametrically opposed end faces of the roller bearing rings.

10 Claims, 3 Drawing Figures

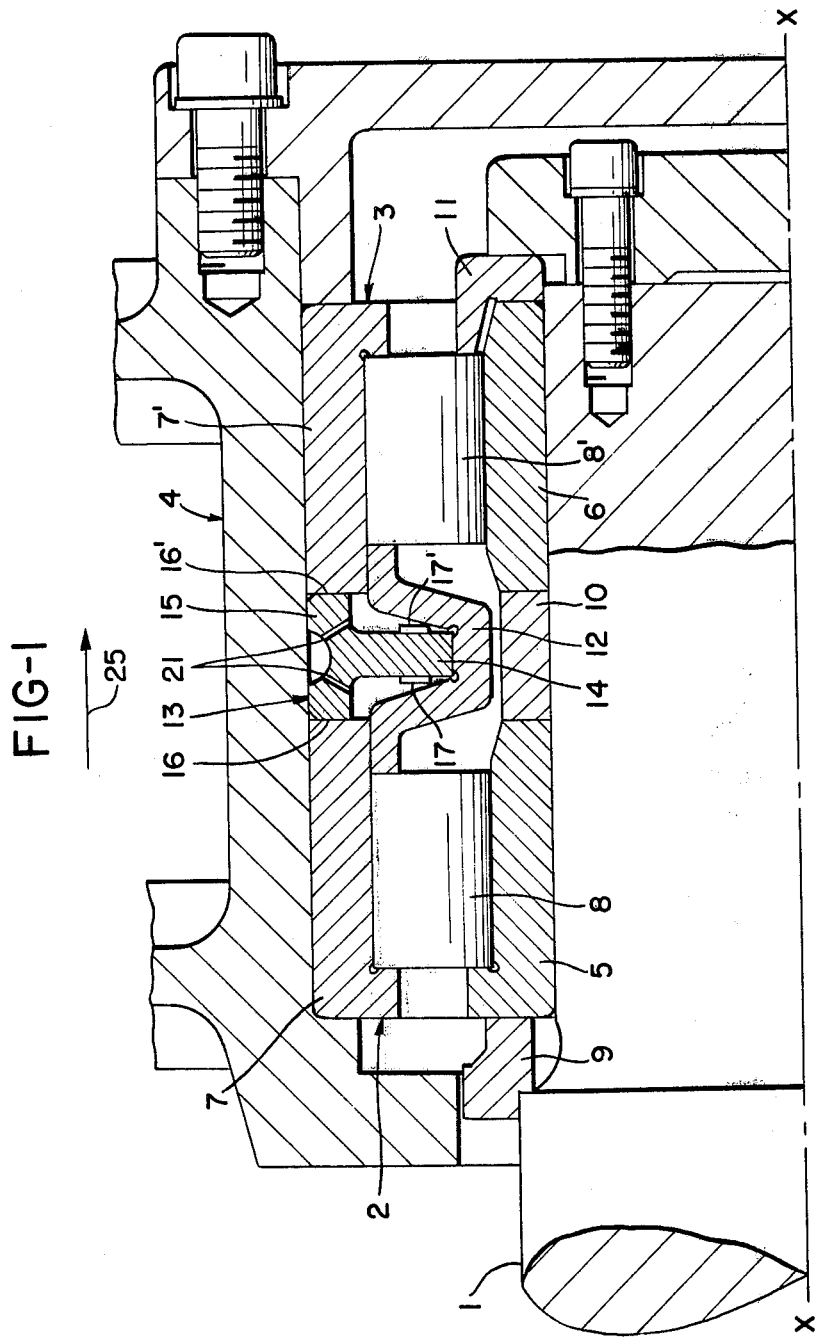

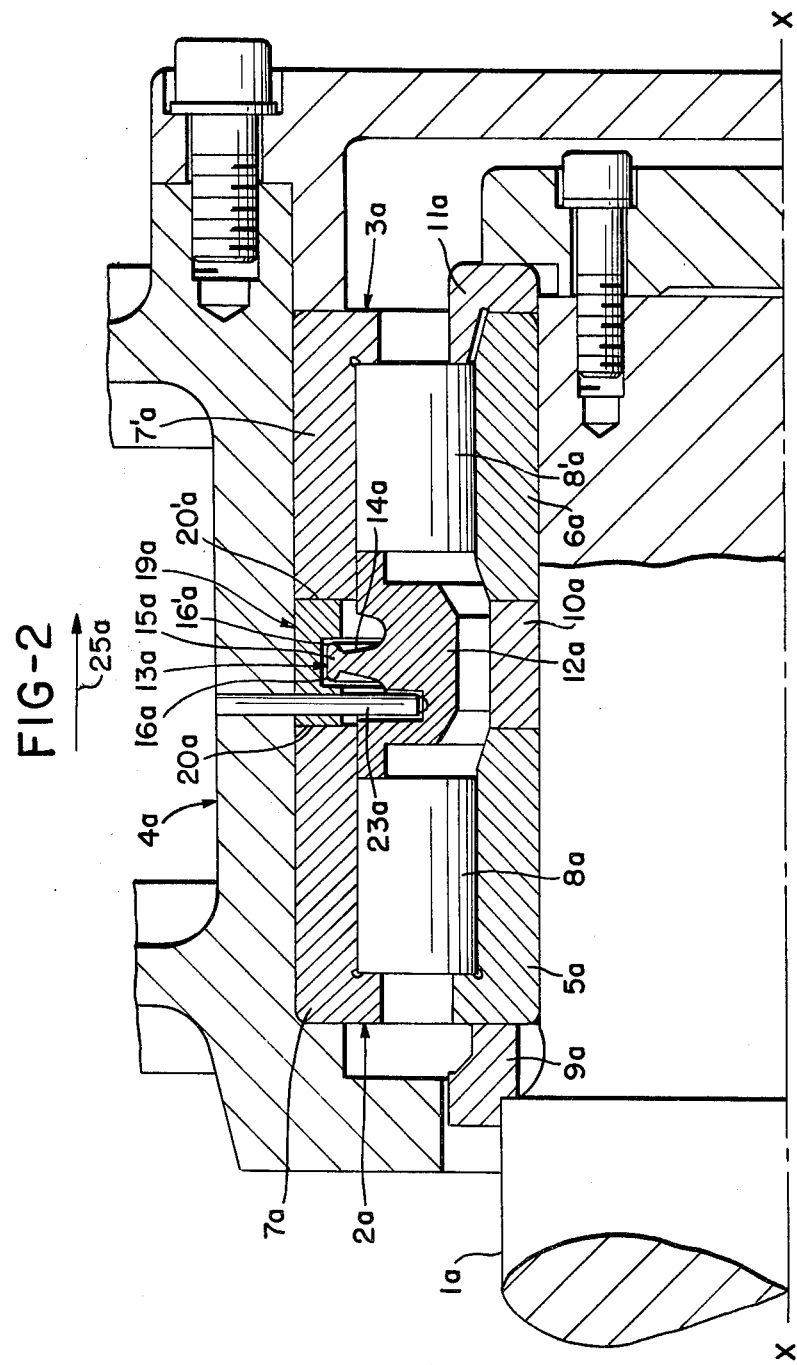

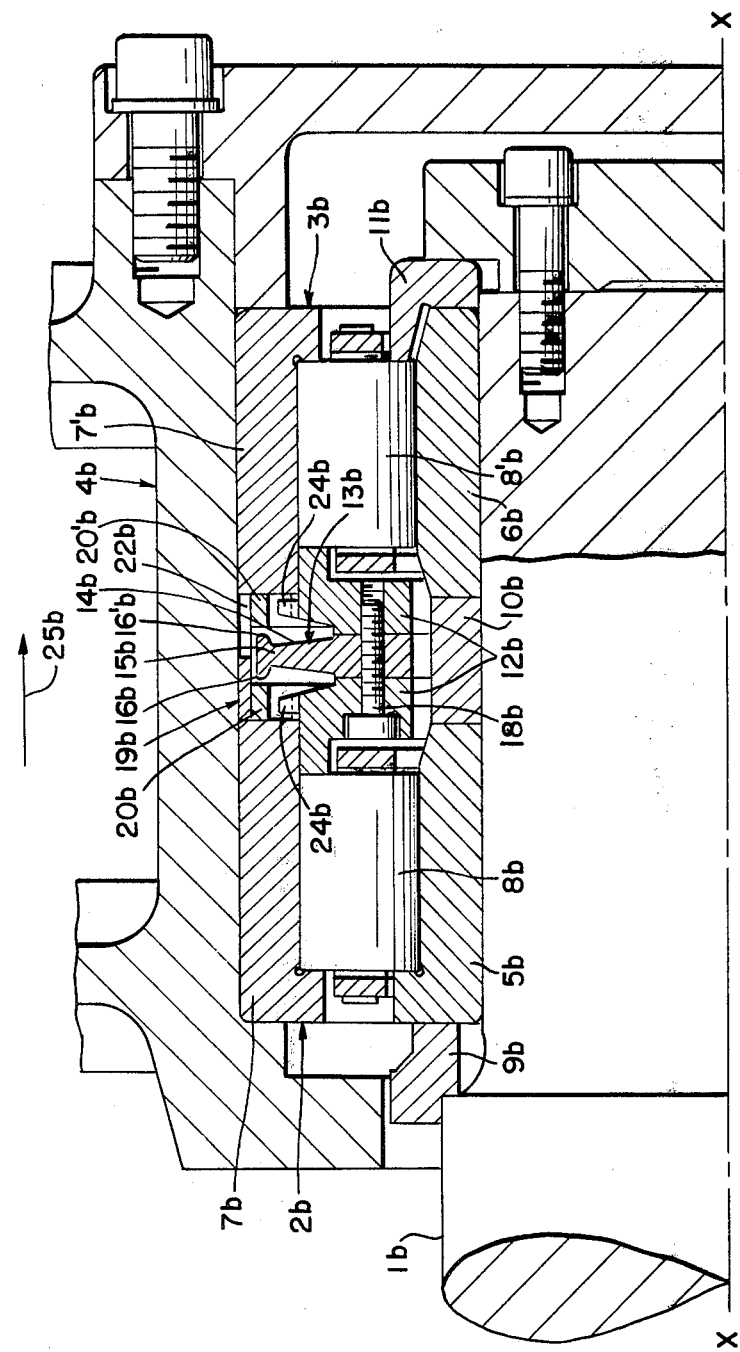

DEVICE FOR MEASURING THE AXIAL FORCE IN A SHAFT JOURNALLED BY ROLLER BEARINGS

The present invention relates to a device for measuring the axial force in a shaft journalled or mounted with two roller bearings arranged side by side in a housing, with such measuring occurring by means of wire strain gauges or the like, the inner ring of the roller bearing on the shaft side engages a shaft shoulder, and the end faces of the roller bodies of the roller body row facing the bearing cover are supported by the flangeless inner ring of the adjoining roller bearing against an angle ring or flanged ring which is disengageably arranged on the shaft. This device is especially intended for wheel-set shafts of rail vehicles during travelling operation.

For axial force measurements on axially flexible axle bearings of rail vehicles, it is known to respectively arrange a force measuring pressure gauge or capsule-type dynamometer on both end faces of the axle shaft, each dynamometer being provided with wire strain gauges (Journal "Wälzlagertechnik"/a/ lzlagertechnik" (Roller Bearing Technology) February 1969, pages 30 through 32). Each dynamometer is connected on one side by a pressure cap, a truncated-cone rubber-ring spring adjacent thereto, a pressure ring, as well as an angle ring with the roller bearing on the cover side, and on the other side is positively connected with a slip-ring head. The angle ring is elastically pressed against the end face of the flanged-ring-less inner ring of the roller bearing on the cover side by the pressure cap at a predetermined initial stressing force via the truncated-cone rubber-ring spring and the pressure ring. The axial force is hereby transmitted from the axle-bearing or journal-box guide into the bearing housing, from there into the inner flanged ring of the outer ring of the roller bearing on the cover side, and further via the roller body row thereof onto the angle ring, which at an axial force exceeding the initial stressing force of the truncated-cone rubber-ring spring is axially shifted until its end face engages the pressure cap; a rigid transfer of the axial force subsequently results. Disadvantageous with this previously known embodiment is that the force measuring pressure gauges or capsule-type dynamometers, with their wire strain gauges, are not constantly arranged in the main force flow, but are also arranged in a secondary force flow, so that the wire gauges are only indirectly deformed and consequently a signal is released or triggered only after a predetermined initial stressing force is exceeded. Additionally, the force flow at each bearing location occurs only in one direction, and an increased space requirement is necessary for accommodating the measuring device externally of the axial bearing housing, with space conditions already being limited.

It is therefore an object of the present invention, with a measuring device of the aforementioned general type, to free the force measurement of disturbing influences as well as to receive or take up the axial tangential stresses in both directions with machine elements which collectively occupy a minimum of space and are less costly.

This object, and other objects and advantages of the present invention, will appear more clearly from the following specification in connection with the accompanying drawings, in which:

FIG. 1 schematically illustrates a cross section of the shaft journalling and one embodiment of the measuring device according to the present invention, with the central flanged ring being positively connected with the gauge or measuring ring, which in turn is positively connected with the outer rings of the two roller bearings;

FIG. 2 is a schematic illustration similar to the embodiment of FIG. 1, though having a unitary or one-part flanged-/measuring ring, which is positively connected with a spacer ring arranged between the outer rings of the two roller bearings; and FIG. 3 is a view, similar to those of FIGS. 1 and 2, of a two-part, assembled or screwed-together central flanged ring with a measuring ring located therebetween.

The measuring device of the present invention is characterized primarily in that:

(a) those end faces of the roller bodies of the two roller body rows facing each other are supported on a central flanged ring which transfers force, and is movable in the direction of force when force is applied;

(b) a gauge ring is located between the central flanged ring and those two end faces of the roller bearing rings which are located diametrically opposite each other, with a part of the gauge ring being arranged transverse to the shaft axis, being operatively connected with the central flanged ring, and being provided with wire strain gauges or the like;

(c) the gauge ring has a part remote from the central flanged ring; this part is positively connected, by means of pressure surfaces on both sides, with the diametrically opposed end faces of the roller bearing rings; a spacer ring having stop rings on both sides may be interposed between the pressure surfaces and the end faces of the roller bearing rings; and (d) the spacer ring, supported against opposing end faces of the roller bearing rings, and the central flanged ring are rigidly connected with each other by suitable elements and are secured against unintended rotation thereof.

Due to the construction in accordance with the present invention, it is possible to eliminate the cup-shaped housing of the measuring devices according to the state of the art, which housings are needed to accommodate parts associated with the measuring device, and which are fastened at the opening on the bearing cover side on the bearing housing. Especially advantageous is that the measuring device, in spite of its very simple construction of only a few parts, makes possible a reliable, exact force transfer because the measuring elements are now arranged in the direct vicinity of the force application or introduction. In spite of this considerable simplification, the measuring device has a very compact construction, since the structural parts serving for measurement are located in the interior of the bearing housing.

Finally, also the required additional parts are installed or accommodated in such a way as to be extremely insensitive to defects and disturbances, so that as a rule additional service or maintenance costs do not result. Additionally, the measured-value pick-ups or receivers, after termination of the measurement, can remain in the bearing without disturbing the further operation. Moreover, this measuring device can subsequently be installed in the bearing housing of shaft bearings already in operation without great cost or complexity.

According to further advantageous specific or preferred embodiments of the present invention, the central flanged ring and the gauge ring may each be unitary or in one piece, and may be positively connected with each other.

The central flanged ring may also comprise two disc-shaped parts which are braced or stressed toward each other by clamping bolts, with the gauge ring being located between these two parts.

The central flanged ring and the gauge ring may be made of one piece, i.e. may be unitary.

The central flanged ring preferably has a U-shaped or trapezoidal cross section, whereby both end segments are bent outwardly and form the sides.

The gauge ring part which extends transverse to the shaft axis may comprise a single disc, or several connection members in the form of spokes or the like.

Referring now to the drawings in detail, in the illustrated shaft mounting or journalling, a shaft 1 with two roller bearings 2 and 3 is supported or mounted in a bearing housing 4 which is closed outwardly by a bearing cover not shown in greater detail. The roller bearing 2 on the shaft side has an inner ring 5 with a fixed or rigid side flange, while the roller bearing 3 on the bearing cover side has an inner ring 6 without a fixed or rigid side flange.

The outer rings 7 and 7' of the two roller bearings are each provided with a firm or fixed side flange; a roller body row 8, 8' is respectively located between each pair of inner ring and outer ring. The inner ring 5 of the roller bearing 2 which faces the shaft has its outer end face resting against a shaft shoulder 9, with its inner end face cooperating with a spacer ring 10 against which, in turn, the inner end face of the inner ring 6 engages, which inner ring 6 has no fixed side flange and is associated with the roller bearing 3 on the bearing cover side. An angle ring 11 is arranged on the shaft 1 subsequent to this roller bearing 3; the angle ring 11, with that leg directed at right angles to the shaft axis x—x, is pressed against the outer end face of the inner ring 6 of the roller bearing 3. That leg of the angle ring 11 which extends parallel to the shaft axis x—x rests against the outer end face of the roller body row 8'. Those end faces of the roller bodies of the two roller body rows 8 and 8' which face each other are supported or engage against a central flanged ring 12, which is connected with a gauge or measuring ring 13. The gauge ring 13 has a part 14 which extends from the flanged ring 12 transverse to the shaft axis x—x, and a part 15, with pressure surfaces 16, 16' on both sides, connected to the part 14. The gauge ring part 14, which is transverse to the shaft axis x—x, can comprise either an entirely rigid metal disc, or several members; in the form of spokes or the like, which connect the central flanged ring 12 with the gauge ring part 15. Strain measuring strips or wire strain gauges 17, 17' are arranged on both sides of the gauge ring part 14. These gauges 17, 17' can be fastened at different distances relative to each other and from the shaft axis x—x.

In the embodiments of FIGS. 1 and 3, the central flanged rings 12 and 12b, and the gauge rings 13 and 13b, are independent structural parts. This is in contrast to the embodiment of FIG. 2, where the central flanged ring 12a is unitary with the gauge ring 13a. The central flanged ring 12b of FIG. 3 comprises two symmetrical parts which receive the gauge ring 13b therebetween and which are stressed or braced toward each other by several clamping bolts 18b distributed uniformly over the periphery. The central flanged rings 12 can have an approximately U-shaped or trapezoidal cross section, and the gauge rings 13 can have a T-shaped cross section as a result of the pressure surfaces 16, 16' on both sides thereof.

In the embodiment of FIG. 1, the pressure surfaces 16, 16' of the gauge ring 13 are positively connected with the opposed end faces of the outer rings 7, 7' of the two roller bearings 2 and 3. In contrast thereto, FIGS. 2 and 3 show embodiments with which spacer rings 19a and 19b are respectively interposed between the end faces of the outer roller bearing rings 7a, 7'a and 7b, 7'b respectively. On both sides each spacer ring 19a and 19b has inwardly directed end collars or stop rings 20a, 20'a, or 20b, 20'b which are positively connected with the pressure surfaces 16a, 16'a or 16b, 16'b of the gauge rings 13a or 13b.

The gauge ring part 15 or spacer ring 19b located between the opposing end faces of the two outer roller bearing rings 7, 7' or 7b, 7'b is provided with bores 21 (FIG. 1) or cutouts 22b (FIG. 3) through which connecting cables are guided from the wire strain gauges 17, 17', which are located on the gauge ring part 14, to a non-illustrated measuring device.

To avoid an unintended rotation of the central flanged ring 12a, 12b relative to the spacer ring 19a, 19b located between the opposing end faces of the two outer roller bearing rings 7a, 7'a, 7b, 7'b, the parts 12a, 12b and 19a, 19b can be secured either by a pin 23a (FIG. 2) or by teeth 24b (FIG. 3).

An axial force effective from the shaft shoulder 9 upon the fixed side flange of the inner ring 5 of the roller bearing 2 is transferred via the roller body row 8 to the central flanged ring 12, and then via the associated gauge ring 13 and the fixed side flange of the outer ring 7', of the roller bearing 3 on the bearing cover side, to the bearing housing 4.

In so doing, the central flanged ring 12, with the cooperating gauge ring 13, is moved in the direction of the arrow 25 until the pressure surface 16' of the gauge ring part 15 engages against the stop ring 20'a, 20'b of the spacer ring 19a, 19b, or against the inner end face of the outer ring 7' of the roller bearing 3. The gauge ring part 14, which extends transverse to the shaft axis x—x, is likewise bent by the force effective via the central flanged ring 12 in the direction of the arrow 25, whereby the wire strain gauges 17, 17' fastened on both sides of the part 14 in a known manner detect the tangential stresses which occur.

An axial force introduced from the angle ring 11 onto the roller body row 8' also reaches, via the central flanged ring 12 as well as the gauge ring 13, which however are moved counter to the direction of the arrow 25, the outer ring 7 of the roller bearing 2 on the side of the shaft, and via the fixed side flange thereof reaches the bearing housing 4.

Variations of the illustrated and described embodiments are also possible. For example, it is possible to lengthen or extend the inner rings 5, 6 of the two roller bearings 2 and 3 in such a way that their end faces which are directed toward each other abut flush against each other, so that the spacer ring 10 can be eliminated.

The present invention is, of course, in no way restricted to the specific disclosure of the specification and drawings, but also encompasses any modifications within the scope of the appended claims.

What we claim is:

1. A device for measuring the axial force in a shaft which has a shaft shoulder and is journalled by means of two roller bearings arranged side by side in a housing having a bearing cover, with a first one of said roller bearings being located in the vicinity of said bearing cover, and a second one of said roller bearings being located remote from said bearing cover, said device further comprised in that:

said second roller bearing has an inner ring which engages said shaft shoulder, and has an outer ring;

an angle ring is arranged on said shaft in the vicinity of said bearing cover;

said first roller bearing has a flangeless inner ring, and has an outer ring; each of said roller bearings being provided with a row of roller bodies respectively arranged between said outer and inner rings of the roller bearing with which it is associated, with the roller bodies of said row of roller bodies of said first roller bearing being supported on said inner ring of said first roller bearing in such a way that those end faces of said roller bodies of said last-mentioned row of roller bodies which face said bearing cover bear against said angle ring;

a flanged ring, which transfers force and is movable in the direction of force when force is applied, is provided in such a way that those ends of said roller bodies of said rows of roller bodies which face one another are supported on said flanged ring; and a gauge ring is located between said flanged ring and those end faces of said rings of said roller bearings which are diametrically opposed to one another; said gauge ring having a first part which extends at substantially right angles to the axis of said shaft and is operatively connected to said flanged ring, said first part of said gauge ring being provided with means for effecting measurement of said axial force; said gauge ring also having a second part which is connected to said first part and is remote from said flanged ring, said second part of said gauge ring having pressure surfaces on two sides for effecting positive connection of said second part to said diametrically opposed end faces of said rings of said roller bearings.

2. A device according to claim 1, in which said means for effecting measurement of said axial force are wire strain gauges.

3. A device according to claim 1, which includes a spacer ring, having stop rings on two sides, interposed between said pressure surfaces, of said second part of said gauge ring, and said diametrically opposed end faces of said rings of said roller bearings; said spacer ring and said flanged ring being rigidly connected with one another and being secured against unintended rotation thereof.

4. A device according to claim 1, in which said flanged ring and said gauge ring are each separate pieces which are positively connected with one another.

5. A device according to claim 1, in which said flanged ring comprises two disc-shaped parts which are braced toward each other by means of clamping bolts, with said gauge ring being arranged in part between said two parts of said flanged ring.

6. A device according to claim 1, in which said flanged ring and said gauge ring are unitary.

7. A device according to claim 1, in which said flanged ring has a U-shaped or trapezoidal cross section, with the two ends thereof being bent outwardly to form sides for providing said support for those ends of said roller bodies of said rows of roller bodies which face one another.

8. A device according to claim 1, in which said first part of said gauge ring comprises a single disc.

9. A device according to claim 1, in which said first part of said gauge ring comprises several connection members.

10. A device according to claim 9, in which said connection members are in the form of spokes.

* * * * *